US006163311A

United States Patent [19]

Fünfschilling et al.

[11] Patent Number: 6,163,311

[45] Date of Patent: Dec. 19, 2000

[54] DRIVING METHOD FOR A DISTORTED HELIX-FERROELECTRIC LIQUID CRYSTAL CELL

[75] Inventors: Jürg Fünfschilling, Basel; Martin Schadt, Seltisberg, both of Switzerland

[73] Assignee: Rolic AG, Switzerland

[21] Appl. No.: 09/316,211

[22] Filed: May 21, 1999

Related U.S. Application Data

[63] Continuation of application No. 08/869,359, Jun. 5, 1997, abandoned, which is a continuation of application No. 08/371,246, Jan. 11, 1995, abandoned.

[30] Foreign Application Priority Data

Jan. 26, 1994 [CH] Switzerland ................ 233/94

[51] Int. Cl.[7] ................ G09G 3/36; C09K 19/02

[52] U.S. Cl. ................ 345/97; 349/171

[58] Field of Search ................ 345/63, 88, 89, 345/94, 97, 214, 215; 349/33, 37, 49, 133, 171, 172, 173

[56] References Cited

U.S. PATENT DOCUMENTS

| | | | |
|---|---|---|---|
| 4,701,026 | 10/1987 | Yazaki et al. | 345/97 |
| 5,073,010 | 12/1991 | Johnson et al. | 349/172 |
| 5,172,257 | 12/1992 | Patel | 349/173 |
| 5,243,455 | 9/1993 | Johnson et al. | 349/172 |
| 5,353,136 | 10/1994 | Escher et al. | 345/97 |
| 5,408,248 | 4/1995 | Crossland et al. | 345/97 |
| 5,490,000 | 2/1996 | Tanaka et al. | 349/49 |
| 5,493,426 | 2/1996 | Johnson et al. | 349/171 |
| 5,539,555 | 7/1996 | Wand et al. | 349/171 |
| 5,552,912 | 9/1996 | Sharp et al. | 349/171 |
| 5,602,662 | 2/1997 | Rosenblatt et al. | 349/130 |
| 5,646,755 | 7/1997 | Okada et al. | 345/97 |
| 5,895,108 | 4/1999 | Tanaka et al. | 349/173 |
| 5,973,657 | 10/1999 | Okada et al. | 345/89 |

FOREIGN PATENT DOCUMENTS

| | | |
|---|---|---|
| 0 309 774 | 5/1989 | European Pat. Off. . |
| 0 356 730 | 7/1990 | European Pat. Off. . |

OTHER PUBLICATIONS

Abstract corresponding to EP 0 309 774.
Japanese Abstract vol. 18, No. 541, p. 1813.
Tanaka, T. et al., SID International Symposium, Digest of Technical Papers, p. 430–433 (1994).
Fünfschilling et al., Journal of Applied Physics, 66(8), p. 3877–3882.
Fünfschilling et al., Japanese Journal of Applied Physics, vol. 30, No. 4, p. 741–746, (Apr. 1991).
Abstract corresponding to EP 0 356 730.

*Primary Examiner*—Steven J. Saras
*Assistant Examiner*—Paul A. Bell
*Attorney, Agent, or Firm*—Finnegan, Henderson, Farabow, Garrett & Dunner, L.L.P.

[57] ABSTRACT

A driving method comprising providing preparatory pulses to each pixel, which establish a predetermined voltage prior to the data pulses. The preparatory pulses may either unload the pixel to a resulting potential of 0 V or load it to a resulting voltage of the same polarity as the charge on the pixel in the subsequent frame time.

7 Claims, 3 Drawing Sheets

DRIVING METHOD FOR A DISTORTED HELIX-FERROELECTRIC LIQUID CRYSTAL CELL

This is a continuation of application Ser. No. 08/869,359, filed Jun. 5, 1997 now abandoned, which is a continuation of Ser. No. 08/371,246, filed Jan. 11, 1995, now abandoned, which is incorporated herein by reference.

BACKGROUND OF THE INVENTION

1. Field of the Invention

The invention relates to a method for driving a pixel of a ferroelectric liquid crystal cell having a distorted helix structure (DHF-LCD). DHF-LCDs are described in European Patent EP 0 309 774 B1.

2. Description

Ferroelectric liquid crystal cells having a distorted helix structure can be operated in two different modes. In the asymmetrical mode the cell is disposed between crossed polarisers such that the transmission is at a minimum for a certain voltage, for example negative voltage $-U_o$, and at a maximum for a certain voltage, for example positive voltage $+U_o$. In the symmetrical mode the cell is disposed such that the transmission for 0 V applied voltage is at a minimum- and increases for positive and negative voltages.

In the asymmetrical mode the cell is more sensitive, that is the electro-optical effect is approximately twice that in the symmetrical mode. Against this there is the risk that, in the event of the driving not being free from a DC voltage or the spontaneous polarization having the same polarity for many frame times, electrochemical processes are initiated or polarization charges are generated in the orientation layers of the liquid crystal cell. Both effects may lead to phantom images. In the symmetrical mode, this can be avoided by driving an image alternately with a positive voltage and a negative voltage.

In both modes, it is important to be able to switch as quickly as possible from one grey scale value to another. In the symmetrical mode, this is more difficult because a greater liquid crystal movement is required for the same change of grey scale value.

Important applications of DHF-LCDs require active matrix driving, that is, semiconductor elements (transistors or diodes) are associated with each pixel and permit multiplex display operation.

BRIEF SUMMARY OF THE INVENTION

The present invention provides a driving method with which the shortest possible switching time of DHF-LCDs is achieved with the lowest possible voltage in combination with an active matrix.

The method comprises bringing each pixel to a predetermined voltage before supplying a data pulse.

DETAILED DESCRIPTION OF THE INVENTION

The invention relates to a driving method for a liquid crystal cell of DHF type, which method comprises charging a pixel to a predetermined voltage and subsequently supplying a data pulse.

The pixel can be unloaded line-wise to a potential 0 V before supplying the data pulse. Alternatively, the pixel can be charged line-wise to the predetermined voltage by prepulses of the same polarity as the data pulse.

The pixel may be charged to a maximum, e.g., negative or positive voltage and then discharged to a required grey scale value wherein the data pulse consists of pulses of different amplitude, which may range from a minimum negative voltage to the maximum positive voltage. Alternatively, the pixel may be charged line-wise to an, e.g., negative or positive maximum voltage and then discharged to a required grey scale value wherein the data pulse consists of pulses of maximum positive voltage and of differing pulse lengths.

Preferably, the data pulse consists of a plurality of consecutive pulses at intervals, each interval being equal to or greater than a characteristic charging time of the helix.

Operational embodiments of the invention will be described hereinafter with reference to the accompanying drawings in which:

DESCRIPTION OF THE PREFERRED EMBODIMENTS

Figure 1:
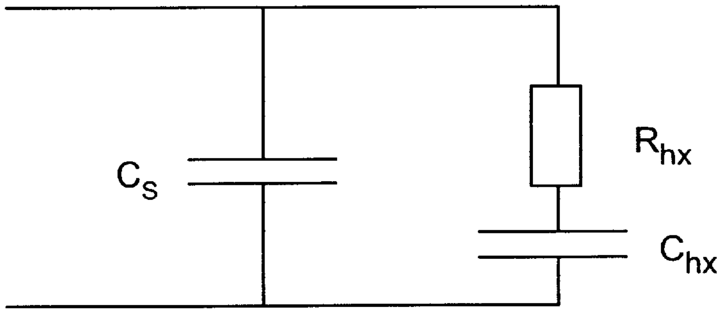
FIG. 1 is an equivalent circuit diagram of a DHF pixel.

In the DHF pixel equivalent circuit diagram shown in FIG. 1, the static capacity $C_s$ is the capacity at which the director does not move. $C_{hx}$ describes the fact that the deformation of the ferro-electrical helix is accompanied by a charge (polarization charge). $R_{hx}$ describes the frictional losses associated therewith. For liquid crystal mixtures with a high spontaneous polarization $C_{hx}$ is many times greater than $C_s$. The charging up of $C_s$ is rapid and is limited solely by the output impedance of the voltage source used. The charging time of $C_{hx}$, on the other hand, is defined by $\tau = R_{hx}C_{hx}$.

If a DHF cell is driven with an active matrix, then there is a low-ohmic signal at the pixel during the line addressing time $t_z$ (typically 64 μsec). The pixel is then isolated until the next image (typically 40 ms). During this time the charge which has migrated to the pixel in the line addressing time is divided over the two capacities such that they are charged to the same voltage. If the resulting charge on $C_{hx}$ is sufficient to produce the required deformation there are no problems. This applies particularly if the characteristic time $\tau$ is many times shorter than $t_z$ ($C_{hx}$ is then charged up directly and $C_s$ has no significance) and/or when the voltage used is so high that sufficient charge is stored on $C_{hx}$ after the voltage equalization.

Since $\tau$ becomes longer than permissible particularly at low temperatures, relatively high voltages must therefore be used. This is particularly so because $C_s$ is much smaller than $C_{hx}$. In order to bring sufficient charge on $C_s$ (the majority flows to $C_{hx}$ on the charge equalization), a correspondingly higher charging voltage is therefore required.

High charging voltages are, however, not compatible with the active matrix technology. Driving methods which can reduce the required voltage are therefore preferable.

If a voltage source with the maximum voltage $U_o$ is available, the charge $Q_o = C_sU_o$ is stored on the pixel with a very short driving time $\tau o$ ($C_{hx}$ is not appreciably charged). After some time of $\tau$, $Q_o$ has divided up over the two capacities. This cycle can be repeated several times (n times), with $C_{hx}$ always being charged up further. The total time during which a pixel is addressed is $n\tau_o$. Since $\tau_o$ can be made very short, i.e. $n\,\tau_o<t_z$, the total time $t_z$ permissible for multiplexing is not exceeded and is simply distributed over a number of separate shorter times.

Figure 2:
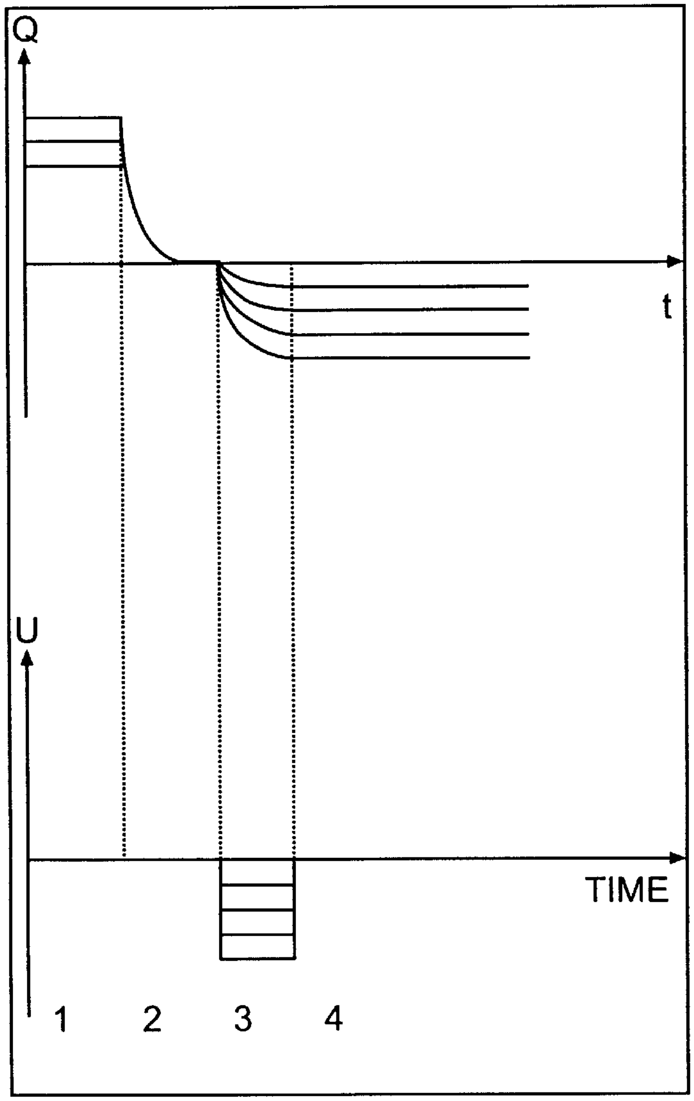
FIG. 2 is a pulse diagram for one form of driving pulse.
Figure 3:
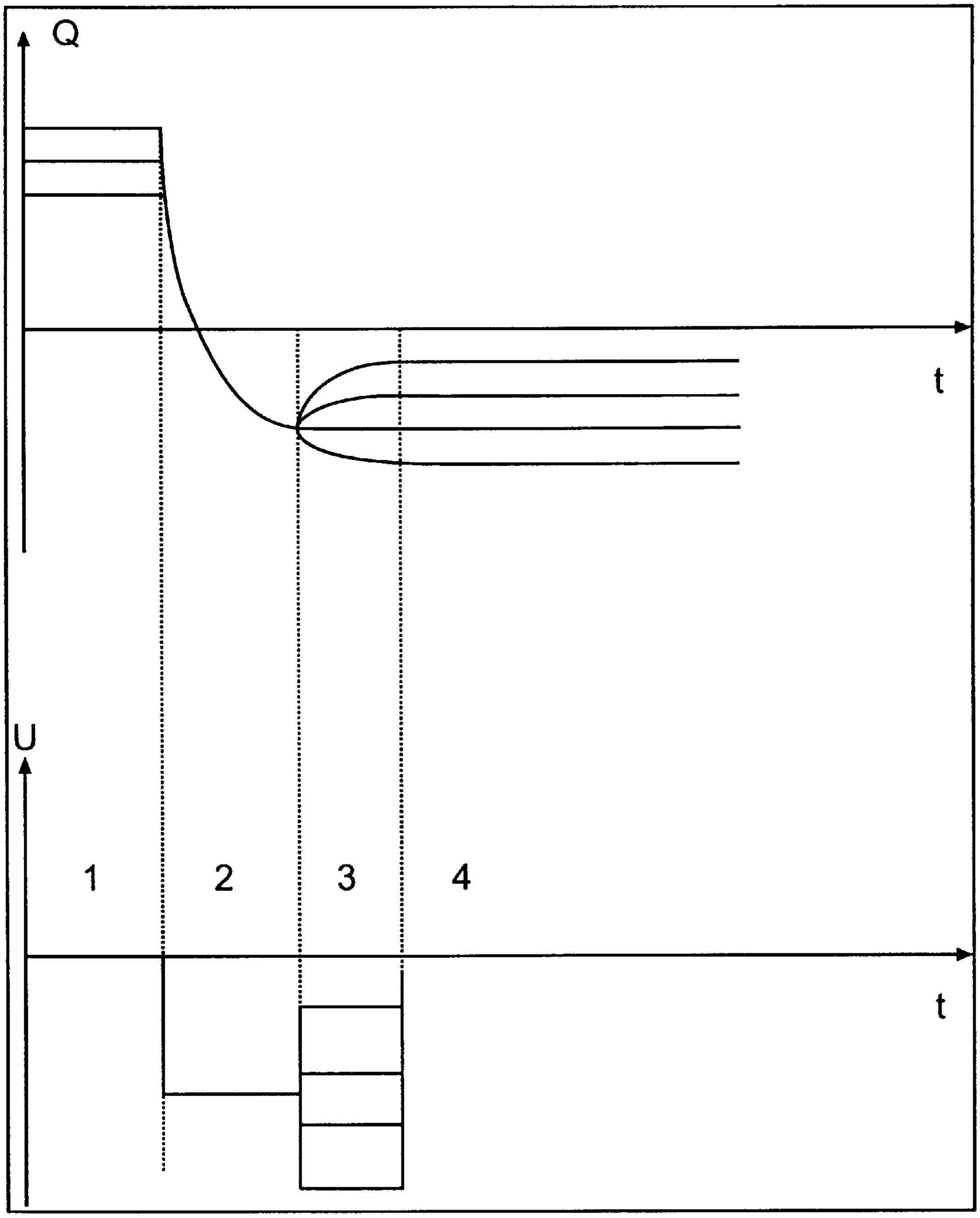
FIG. 3 is a pulse diagram of an alternative form of driving pulse.
Figure 4:
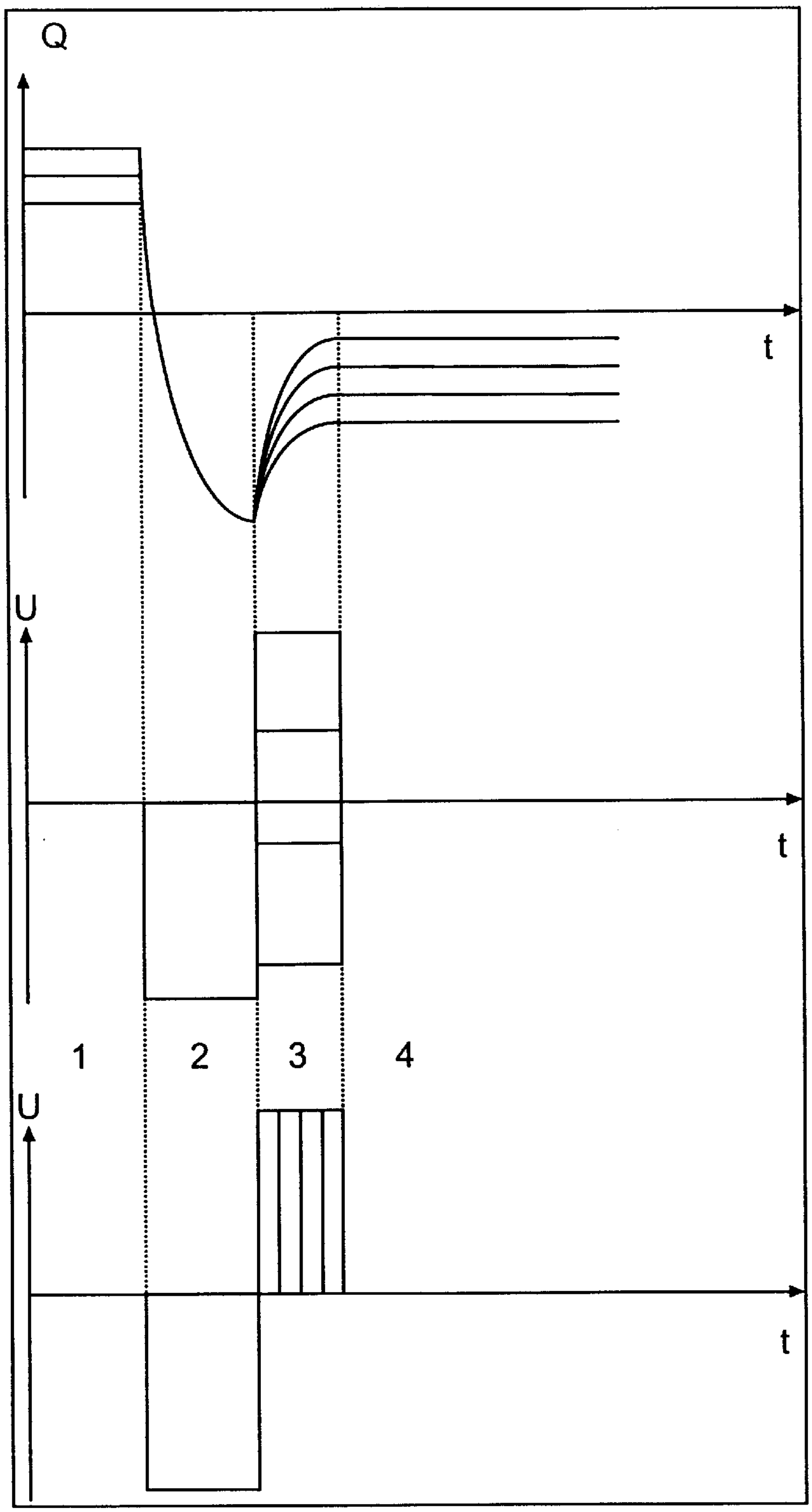
FIG. 4 is a pulse diagram of another alternative form of driving pulse.

In order to ensure that a DHF cell operation is free from DC voltage, the driving polarity must change from image to image. Preferably, the pixel is therefore first discharged before the new information can be written in. This is done by means of pulses which are applied to a full line before the insertion of the data (grey scale values). Basically three variants of such pulses are suitable and are shown in FIGS. 2 to 4. These figures show respectively the applied voltage U and the charge Q on the pixel and four time slots 1–4. During the times before (time slot 1) and after (time slot 4) the driving the pixel is isolated, i.e. the voltage applied is not defined.

The pre-pulses shown at the bottom of FIG. 2 during time slot 2 discharge the pixel so that the data pulses during the time slot 3 only have to effect charging to the new grey scale value.

The pre-pulses during time slot 2 as shown at the bottom of FIG. 3 already pre-charge the pixel to a suitable value. The data pulses during time slot 3 then have to supply or discharge less charge. The data pulses have the same polarity as the pre-charging pulses. The pre-pulses shown in the middle and at the bottom of FIG. 4 during the time slot 2 charge the pixel to the maximum voltage. The data pulses during time slot 3 then discharge the pixel to the required grey scale value. This can be done in two ways: either (1) by amplitude modulation as in FIGS. 2 and 3, that is by pulses of different amplitudes (FIG. 4 centre), the full voltage swing from $-U_o$ to $U_o$ being utilizable, or (2) by pulse width modulation, that is by pulses of maximum voltage $U_o$ but different pulse lengths (bottom of FIG. 4). With this type of driving, the polarity need not change in dependence on the grey scale value as with amplitude modulation.

Pre-pulses with maximum voltage saturate the pixel, and this reduces the risk of crosstalk from data information of other lines addressed during the pre-charging pulse.

What is claimed is:

1. A driving method for a distorted helix-ferroelectric (DHF) structure liquid crystal cell operated in the symmetrical mode, the method comprising charging at least one line of pixels to a first predetermined voltage; applying a data pulse to each pixel of the at least one line of pixels to generate a gray scale value of a desired image; and for a subsequent image charging the at least one line of pixels to a second predetermined voltage of the opposite sense to the first predetermined voltage; and providing a second data pulse to each pixel of the at least one line of pixels to generate a second gray scale value of said subsequent image.

2. A driving method according to claim 1, comprising unloading line-wise the pixel to a potential of 0 volts (V) before supplying the data pulse.

3. A driving method according to claim 1, wherein each pixel of the at least one line of pixels is charged line-wise to the predetermined voltage by pre-pulses of the same polarity as the data pulse.

4. A driving method according to claim 1, comprising charging each pixel of the at least one line of pixels line-wise to a maximum voltage; and discharging each pixel of the at least one line of pixels to a required gray scale value, wherein the data pulses consists of pulses of different amplitude which may range from a minimum voltage of the same polarity to a maximum voltage with a polarity opposite to that of at least one of a plurality of pre-pulses.

5. A driving method according to claim 1, comprising charging each pixel of the at least one line of pixels line-wise to a maximum positive voltage; and discharging each pixel of the at least one line of pixels to a required gray scale value, wherein the data pulse consists of pulses of maximum voltage with a polarity opposite to that of at least one of a plurality of pre-pulses and the data pulse consists of pulses of different lengths.

6. A driving method according to claim 1, wherein the data pulse consists of a plurality of consecutive pulses at intervals, each interval being equal to or greater than a characteristic charging time of the helix.

7. A driving method according to claim 1, comprising charging each pixel of the at least one line of pixels line-wise to a maximum negative voltage; and discharging each pixel of the at least one line of pixels to a required gray scale value, wherein the data pulse consists of pulses of maximum voltage with a polarity opposite to that of at least one of a plurality of pre-pulses and the data pulse consists of pulses of different lengths.

* * * * *

UNITED STATES PATENT AND TRADEMARK OFFICE

CERTIFICATE OF CORRECTION

PATENT NO. : 6,163,311
DATED : December 19, 2000
INVENTOR(S) : Jurg Funfschilling and Martin Schadt It is certified that error appears in the above-identified patent and that said Letters Patent is hereby corrected as shown below:

Title page,
Item [54], please change the title to -- DRIVING METHOD FOR A DISTORTED HELIX-FERROELECTRIC LIQUID CRYSTAL CELL IN SYMMETRICAL MODE TO PRODUCE GRAY SCALE --.

Signed and Sealed this

Thirtieth Day of April, 2002

*Attest:*

JAMES E. ROGAN

*Attesting Officer*

*Director of the United States Patent and Trademark Office*